Figure 1:
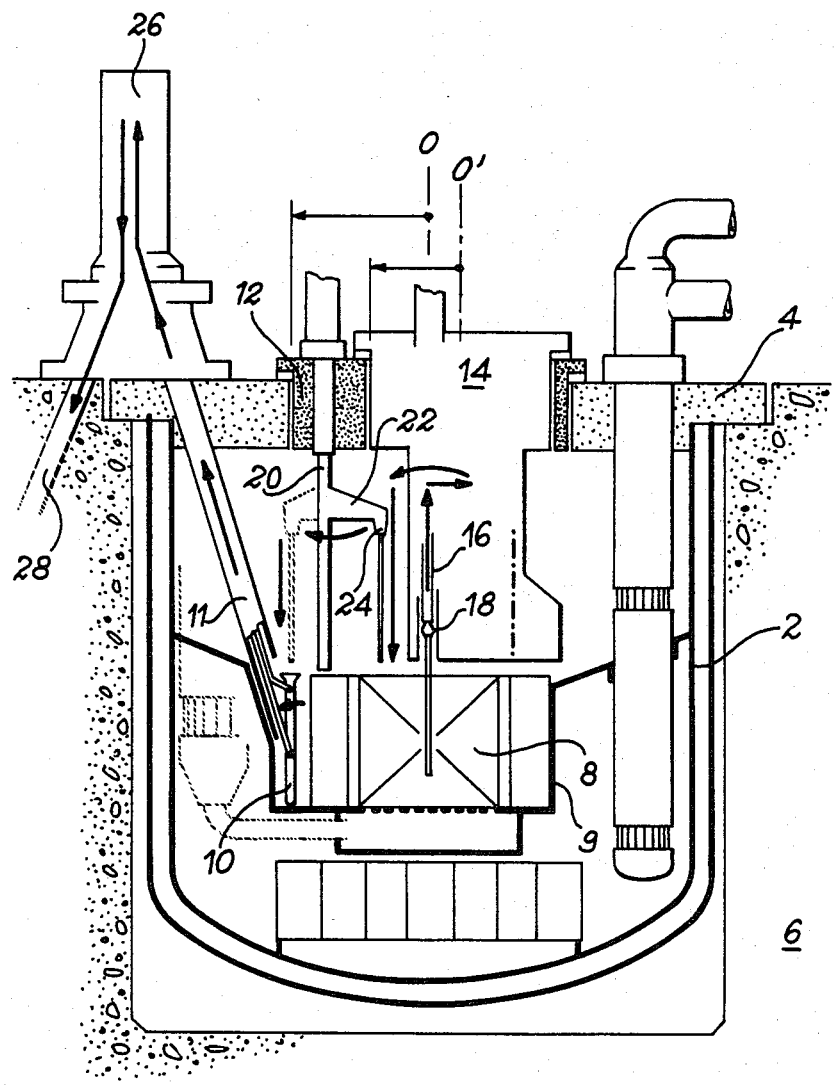

United States Patent [19]

Aubert et al.

[11] Patent Number: 4,507,261
[45] Date of Patent: Mar. 26, 1985

[54] HANDLING PROCESS AND INSTALLATION FOR THE ASSEMBLIES OF A NEUTRON NUCLEAR REACTOR

[75] Inventors: Michel Aubert, Manosque; Charley Renaux, Jouques, both of France

[73] Assignee: Commissariat a l'Energie Atomique, Paris, France

[21] Appl. No.: 286,275

[22] Filed: Jul. 23, 1981

[30] Foreign Application Priority Data

Aug. 14, 1980 [FR] France .................. 80 17961

[51] Int. Cl.³ ............................................ G21C 19/20
[52] U.S. Cl. ........................................ 376/270; 376/460
[58] Field of Search ............... 376/206, 269, 270, 272, 376/460

[56] References Cited

U.S. PATENT DOCUMENTS

| | | | |
|---|---|---|---|
| 2,961,393 | 11/1960 | Monson | 376/175 |
| 3,190,805 | 6/1965 | Straub et al. | 376/270 |
| 3,909,350 | 9/1975 | Dupuy | 376/460 |
| 4,069,098 | 1/1978 | Wade | 376/460 |
| 4,069,099 | 1/1978 | Wade | 376/206 |
| 4,202,728 | 5/1980 | Allain et al. | 376/270 |

OTHER PUBLICATIONS

Nuc. Eng. Int., vol. 22, No. 257, (5/77), pp. 41–45, Banal.

Primary Examiner—Sal Cangialosi
Attorney, Agent, or Firm—Oblon, Fisher, Spivak, McClelland & Maier

[57] ABSTRACT

Installation for handling the assemblies of a fast neutron nuclear reactor comprising a core located in a vertically axed vessel and constituted by a group of assemblies positioned in a supporting grid, a horizontal slab over the vessel, a large rotary plug in the slab, a small rotary plug in the large rotary plug and off-centered with respect to the latter, and a handling pot or container making it possible to remove the fuel elements from the vessel, wherein the small rotary plug has a handling poker and the large rotary plug positioned coaxially with respect to the core has a handling arm, the poker making it possible to reach a fraction of assemblies, particularly those in the central part of the core and to transfer them into a take-up station of the supporting grid, the assemblies placed in the take-up station, as well as those in the peripheral area downwardly accessible to the handling arm being deposited by the latter in the handling pot or container.

6 Claims, 3 Drawing Figures

HANDLING PROCESS AND INSTALLATION FOR THE ASSEMBLIES OF A NEUTRON NUCLEAR REACTOR

The present invention relates to an installation and to a process for handling the assemblies of a fast neutron nuclear reactor.

The core of a fast neutron reactor conventionally comprises elongated boxes containing a group of sheathed needles or rods containing the fissile or fertile material. At the upper end of said boxes there is a gripping head making it possible to raise and transfer each assembly. In their lower part these boxes have a base enabling them to be positioned in the reactor core among adjacent assemblies by engaging them in a horizontal supporting grid.

In fast neutron reactors the reactor core is generally constituted by grouping such assemblies within a vertically axed vessel containing an appropriate volume of a liquid cooling metal, usually sodium. This vessel is open at the top and is suspended on a protective enclosure having thick concrete walls and closed by a horizontal slab above the free level of the liquid metal and separated from the latter by a layer of a covering neutral gas. Access to the reactor core through the slab, particularly for introducing or removing an assembly with respect to the core, is generally provided by a system having two rotary plugs which are off-centred with respect to one another and mounted in a slab opening in such a way that the combined rotations thereof bring into a vertical position with respect to a random assembly a grab which is installed at the lower end of a poker carried by one of the plugs and controlled from the outside of the vessel above the slab. Such a device is described in the French Patent filed on June 27, 1973 in the name of thee Commissariat à l'Energie Atomique and entitled "Handling process for irradiated fuel assemblies in a fast neutron nuclear reactor and installation for performing this process".

However, a device like that described hereinbefore leads to a large vessel diameter. Therefore the cost of such a vessel and in particular that of the stainless steel required for producing it is high.

The present invention relates to an installation and to a process for handling the assemblies of a fast neutron reactor making it possible to obtain a large rotary plug with a smaller diameter than that of the presently known solutions. Therefore it is possible to reduce the vessel diameter, which leads to significant economies in raw materials and therefore to a lower cost of the reactor.

The present invention more specifically relates to an installation for handling the assemblies of a fast neutron nuclear reactor comprising a core located in a vertically axed vessel and constituted by a group of assemblies positioned in a supporting grid, a horizontal slab over the vessel, a large rotary plug in the slab, a small rotary plug in the large rotary plug and off-centred with respect to the latter, and a handling pot or container making it possible to remove the fuel elements from the vessel, wherein the small rotary plug has a handling poker and the large rotary plug positioned coaxially with respect to the core has a handling arm, the poker making it possible to reach a fraction of assemblies, particularly those in the central part of the core and to transfer them into a take-up station of the supporting grid, the assemblies placed in the take-up station, as well as those in the peripheral area downwardly accessible to the handling arm being deposited by the latter in the handling pot or container.

The process for the discharge of the assemblies of the fast neutron reactor according to the invention comprises forming a take-up station, if there is not one already, by removing one or more assemblies, transferring the assemblies from the central area of the core into the take-up station by means of a poker, transferring these assemblies from the take-up station into the handling pot by means of a handling arm and directly transferring the peripheral assemblies of the core into the handling pot by means of the handling arm.

The invention is described in greater detail hereinafter relative to non-limitative embodiments and the attached drawings, wherein show:

FIG. 1 a sectional view of a fast neutron reactor comprising an installation for handling the assemblies in accordance with the invention.

Figure 2:
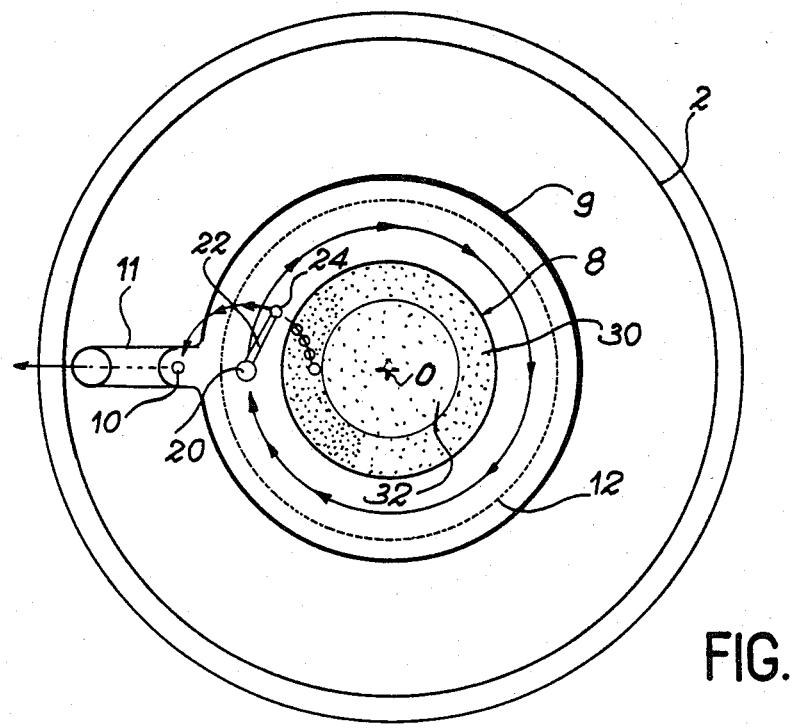

FIG. 2 a sectional view of the nuclear reactor of FIG. 1, showing the transfer of an assembly from the peripheral area of the core to the handling pot by means of the handling arm shown on the large rotary plug.

Figure 3:
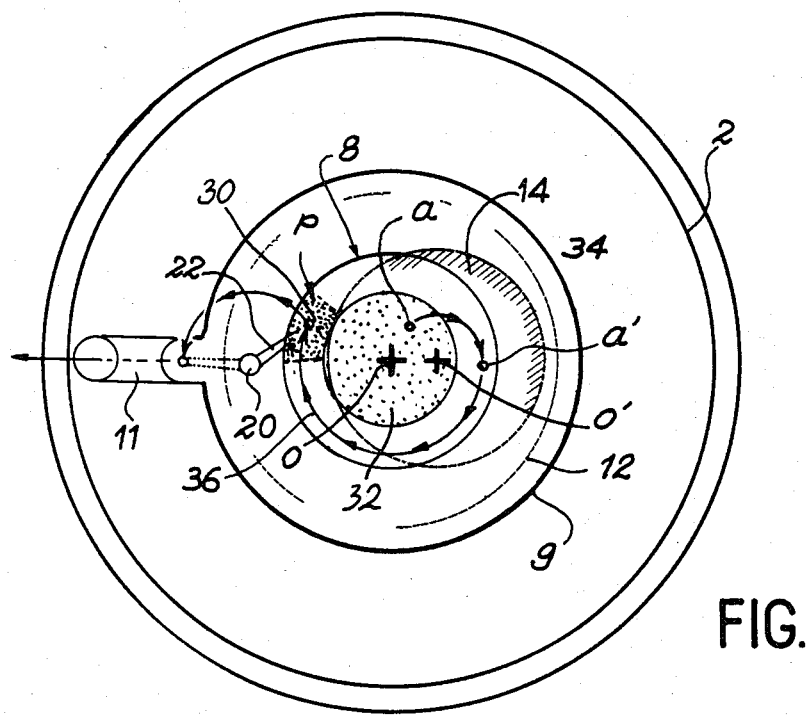

FIG. 3 a sectional view of the reactor of FIG. 1 showing the transfer of an assembly from the central area of the core to its peripheral area by means of the poker mounted on the small rotary plug.

FIG. 1 is a sectional view of a fast neutron reactor comprising a handling installation according to the invention. This reactor comprises a vertically axed main vessel 2 suspended on a horizontal slab 4 and filled with a liquid cooling metal, generally sodium. The liquid sodium level is surmounted by an inert gas layer, conventionally of argon. The horizontal slab 4 rests on a thick-walled concrete enclosure 6. The nuclear reactor core 8 within a supplementary or inner vessel 9 defining two separate regions in the main vessel, is immersed in liquid sodium and is essentially constituted by fertile fuel assemblies. In its upper part each assembly has a handling head permitting its extraction from core 8 and then its transfer into a handling container or pot 10 positioned on the periphery of the core. Pot 10 is able to move along an oblique ramp 11 issuing into vessel 2 and traversing the upper slab 4. A pot of this type is described in French Pat. No. 71 19 431 filed on May 28, 1971 in the name of the Commissariat à l'Energie Atomique and entitled "Handling pot of a fuel assembly".

The horizontal slab 4 has a circular opening in which is mounted an assembly of two rotary plugs, namely a large rotary plug 12 of centre 0 and a small rotary plug 14 of centre 0', which are off-centered with respect to one another. According to the invention the small plug 14 has a handling poker 16. At the lower end of the poker are provided gripping tongs 18 able to grip an assembly of core 8.

The handling arm 20 provided on the large rotary plug 12 is constituted by a vertical body traversing the large rotary plug and a horizontal beam 22 terminated by gripping tongs 24 which are able to grasp an assembly of core 8. A handling arm of this type is, for example, described and claimed in French Pat. No. 142 624 filed on Mar. 6, 1968 in the name of the Commissariat a l'Energie Atomique and entitled "Handling arm".

After being placed in pot 10 the assembly is moved along inclined ramp 11 and removed from vessel 2 outside slab 14. It is then placed in a pivoting member 26 linked with a second oblique ramp 28.

FIG. 2 is a sectional view of the nuclear reactor of FIG. 1 showing the transfer of an assembly from the peripheral area of the core to pot 10. FIG. 2 also shows the main vessel 2, with the inner vessel 9, the handling arm 20 with its horizontal beam 22, pot 10, inclined ramp 11 and core 8.

If l is the distance separating the vertical rotation axis of handling arm 20 from the vertical axis of handling tongs 24, it is clear that the area within which an assembly of the core can be reached by means of the tongs 24 terminating the handling arm 20 is a ring whose centre is that of the large rotary plug and whose width is equal to 2l, i.e. twice the length of the horizontal beam of the handling arm. On the core this ring defines an area 30, called a peripheral area, within which it is possible to directly reach an assembly by means of the handling arm. An irradiated assembly within this area can be extracted in one operation by means of the handling arm. An appropriate rotation of the large rotary plug 12 followed by a rotation of the handling arm makes it possible to bring the gripping tongs 24 over the assembly to be extracted. The fuel assembly can then be transferred into pot 10 and is then removed in per se known manner from reactor vessel 2.

The remainder of core 8, i.e. its area not forming part of the peripheral area 30, is called the central area 32. The assemblies located in this central area cannot be directly reached by means of the handling arm 20. The removal of an irradiated assembly located in the central area 32 takes place in the following way in accordance with the present invention:

in the peripheral area 30 a take-up station P is formed, if one was not provided from the outset, by removing one or more assemblies from the peripheral area of the core by means of arm 20;

by means of a poker located on the small rotary plug or installed during reactor shutdown in place of a control bar mechanism, the assemblies located in the central area of the core are transferred to the take-up station P.

The removal and discharge of a fuel assembly by the process of the invention is illustrated in FIG. 3. Assembly a is located in the central area 32 of the core. An appropriate rotation of the small plug 14 brings poker 16 (cf. FIG. 1) over assembly a and the latter is extracted from the core. A rotation of small plug 14 in the direction of arrow 34 brings assembly a into position a'. A rotation of the large plug in accordance with arrow 36 then brings it over the take-up station P produced in the peripheral area 30. It is then set down. An appropriate rotation of the large plug 12 makes it possible to bring the gripping tongs 24 of arm 20 over the take-up station P. Assembly a positioned in station P is then taken up, as hereinbefore, by means of arm 20 and then transferred into pot 10. It is then removed from the reactor vessel in per se known manner.

A fraction of the fuel assemblies can be extracted from the reactor core directly by means of handling arm 20. There is consequently no need to pass via the take-up station. However, to enable the system of irradiated assemblies to be removed, the presence of the poker on the small rotary plug 14 is necessary for a fraction of the fuel assemblies of core 8.

In order to provide a more specific illustration of the reduction of the diameter of the large rotary plug permitted by the invention, hereinafter two specific numerically qualified embodiments are given for a specific reference core.

EXAMPLE I

According to a first embodiment the length of the horizontal beam 22 of the handling arm is 1,476 mm, the radius of the small rotary plug 3,276 mm and the eccentricity between the two plugs 900 mm. In this case, quite apart from being coaxial to the core, the large rotary plug must have a radius of 4,726 mm.

This large rotary plug radius of 4,726 mm is to be compared with that of a reactor with the same reference core and in which the assemblies are handled only by means of one or two pokers installed on the small rotary plug of radius 3,561 mm and eccentricity with respect to the large rotary plug of 1,185 mm. In this case the radius of the large rotary plug must be 5,296 mm, although its axis is off-centred with respect to that of the core. Thus, this radius has been reduced by 570 mm.

With this solution 92% of the core assemblies can be reached by means of the poker the remaining 8% being directly accessible with the arm.

EXAMPLE II

According to a second embodiment the length of beam 22 is increased to 2,706 mm, the radii of the small rotary plug (3,561 mm), and large rotary plug (4,726 mm), as well as their eccentricity (1,185 mm) being identical to those of Example I. In this case only 9% of the assemblies require a prior transfer of the poker to the take-up station, 91% of the assemblies being directly accessible with the arm. Thus, the reduction in the diameter of the large rotary plug is obtained at the cost of only a minor complication in the manipulation of the fuel assemblies.

We claim:

1. Apparatus for handling the fuel assemblies is a fast neutron nuclear reactor, said nuclear reactor comprising:
   (a) a vertically axed vessel;
   (b) a supporting grid for fuel assemblies disposed in said vessel;
   (c) a core comprising a plurality of fuel assemblies removably positioned in a circular array in said supporting grid;
   (d) a horizontal slab disposed over and sealing said vessel; and
   (e) a handling pot for introducing said fuel assemblies into said vessel and for removing said fuel assemblies from said vessel,
   said apparatus comprising:
   (f) a large rotary plug mounted for rotation in said slab about a first vertical axis located over the center of said core;
   (g) a small rotary plug mounted for rotation in said large rotary plug about a second vertical axis located over said core, said first and second vertical axes being spaced apart;
   (h) a handling poker mounted on said small rotary plug at a point spaced from said second axis, said handling poker incorporating means for gripping one of said fuel assemblies, for lifting it free of the other fuel assemblies in said core, and for holding it while said small rotary plug is rotated; and
   (i) a handling arm mounted on said large rotary plug for rotation about a third vertical axis located radially outwardly of said core, said handling arm extending radially by an amount which permits a working end thereof to be selectively positioned over an annular peripheral part of said core or over said handling pot, the working end of said handling arm incorporating means for gripping one of said fuel assemblies, for lifting it free of the other fuel assemblies in said core, for holding it while said large rotary plug is rotated and/or while said handling arm is rotated about said third vertical axis, and for depositing it in said handling pot, whereby:

(j) said handling poker and said small rotary plug can be used to transfer fuel assemblies back and forth between the central part of said core and a take-up station located in the peripheral part of said core and (k) said handling arm and said large rotary plug can be used to transfer fuel assemblies back and forth between the peripheral part of said core, including said take-up station, and said handling pot.

2. Apparatus as recited in claim 1 wherein:
(a) the annular width of the peripheral part of said core is defined by the radial depth into said core to which said handling arm can reach and
(b) the distance between said first and second axes is less than the distance between said second axis and said point.

3. A process for charging a fast nuclear reactor with fuel assemblies, said nuclear reactor comprising:
(a) a vertically axed vessel;
(b) a supporting grid for fuel assemblies disposed in said vessel;
(c) a core comprising a plurality of fuel assemblies removably positioned in a circular array in said supporting grid;
(d) a horizontal slab disposed over and sealing said vessel; and
(e) a handling pot for introducing said fuel assemblies into said vessel,
said process comprising the steps of:
(f) transferring a fuel assembly from said handling pot to a core take-up station located in an annular peripheral part of said core by means of a handling arm mounted on a large rotary plug, said large rotary plug being mounted for rotation in said slab about a first vertical axis located over the center of said core, said handling arm being mounted for rotation about a third vertical axis located radially outwardly of said core, said handling arm extending radially by an amount which permits a working end thereof to be selectively positioned over said annular peripheral part of said core or over said handling pot, and
(g) transferring said fuel assembly from said take-up station to the central part of said core by means of a handling poker mounted on a small rotary plug, said small rotary plug being mounted for rotation in said large rotary plug about a second vertical axis located over said core, said handling poker being mounted at a point spaced from said second axis.

4. A process as recited in claim 3 wherein:
(a) the annular width of the peripheral part of said core is defined by the radial depth into said core to which said handling arm can reach and
(b) the distance between said first and second axes is less than the distance between said second axis and said point.

5. A process for discharging fuel assemblies from a fast neutron nuclear reactor, said nuclear reactor comprising:
(a) a vertically axed vessel;
(b) a supporting grid for fuel assemblies disposed in said vessel;
(c) a core comprising a plurality of fuel assemblies removably positioned in a circular array in said supporting grid;
(d) a horizontal slab disposed over and sealing said vessel; and
(e) a handling pot for removing said fuel assemblies from said vessel,
said process comprising the steps of:
(f) transferring a fuel assembly from the central part of said core to a core take-up station located in an annular peripheral part of said core by means of a handling poker mounted on a small rotary plug, said small rotary plug being mounted for rotation in a large rotary plug about a second vertical axis located over said core, said handling poker being mounted at a point spaced from said second axis, and
(g) transferring said fuel assembly from said core take-up station to said handling pot by means of a handling arm mounted on said large rotary plug, said large rotary plug being mounted for rotation in said slab about a first vertical axis located over the center of said core, said handling arm being mounted for rotation about a third vertical axis located radially outwardly of said core, said handling arm extending radially by an amount which permits a working end thereof to be selectively positioned over said annular peripheral part of said core or over said handling pot.

6. A process as recited in claim 5 wherein:
(a) the annular width of the peripheral part of said core is defined by the radial depth into said core to which said handling arm can reach and
(b) the distance between said first and second axes is less than the distance between said second axis and said point.

* * * * *